(12) United States Patent
Liu et al.

(10) Patent No.: US 11,973,206 B2
(45) Date of Patent: Apr. 30, 2024

(54) SAFETY DEVICE AND BATTERY USING THE SAME

(71) Applicant: Globe (Jiangsu) Co., Ltd, Jiangsu (CN)

(72) Inventors: Chuanjun Liu, Jiangsu (CN); Ming Luo, Jiangsu (CN); Huage Wang, Jiangsu (CN); Xian Zhuang, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 208 days.

(21) Appl. No.: 17/080,811

(22) Filed: Oct. 26, 2020

(65) Prior Publication Data

US 2021/0135306 A1 May 6, 2021

(30) Foreign Application Priority Data

Oct. 30, 2019 (CN) .......................... 201911045022.9

(51) Int. Cl.
| | |
|---|---|
| *H01M 10/6551* | (2014.01) |
| *H01H 85/00* | (2006.01) |
| *H01H 85/041* | (2006.01) |
| *H01H 85/08* | (2006.01) |
| *H01M 50/581* | (2021.01) |
| *H01M 50/583* | (2021.01) |

(52) U.S. Cl.
CPC .... *H01M 10/6551* (2015.04); *H01H 85/0039* (2013.01); *H01H 85/08* (2013.01); *H01M 50/581* (2021.01); *H01M 50/583* (2021.01); *H01H 2085/0412* (2013.01); *H01M 2200/103* (2013.01)

(58) Field of Classification Search
CPC ....... H01M 10/6551; H01M 2200/103; H01M 50/572; H01M 50/574; H01M 50/581; H01M 50/583; H01H 2085/0412
See application file for complete search history.

(56) References Cited

U.S. PATENT DOCUMENTS

| | | | |
|---|---|---|---|
| 2,858,396 A | 10/1958 | Sugden | |
| 4,689,598 A * | 8/1987 | Ishikawa | ................ H01H 85/10 337/159 |
| 5,373,278 A * | 12/1994 | Saulgeot | ............ H01H 85/0417 337/261 |

(Continued)

FOREIGN PATENT DOCUMENTS

| | | |
|---|---|---|
| DE | 202013008375 U1 | 12/2014 |
| DE | 212017000280 U1 | 7/2019 |
| EP | 1780819 A1 | 5/2007 |

OTHER PUBLICATIONS

Search Report of Counterpart European Patent Application No. 20204495.4 dated Mar. 30, 2021.

*Primary Examiner* — Scott J. Chmielecki (57) ABSTRACT

A safety device comprises a first heat dissipation part, a second heat dissipation part and a connecting part. The connecting part is arranged between the first heat dissipation part and the second heat dissipation part, and at least one heat locking hole disposed thereon. The heat locking hole of the connecting part can reduce a diffusion speed of heat of the connecting part, so that the heat is concentrated between the first heat locking hole and the second heat locking hole, and thus the connecting part can be fused in time at a high temperature.

18 Claims, 9 Drawing Sheets

(56) References Cited

U.S. PATENT DOCUMENTS

| | | | |
|---|---|---|---|
| 2006/0214259 A1* | 9/2006 | Spaunhorst | H01L 24/01 257/529 |
| 2008/0278276 A1* | 11/2008 | Banzo | H05K 3/222 337/186 |
| 2014/0240942 A1* | 8/2014 | Itabashi | H05K 1/18 361/772 |
| 2017/0263407 A1* | 9/2017 | Schlaak | H01H 85/185 |
| 2020/0335295 A1* | 10/2020 | Hong | H01H 85/143 |

* cited by examiner

SAFETY DEVICE AND BATTERY USING THE SAME

CROSS-REFERENCE TO RELATED INVENTION

This invention is a US application which claims the priority of CN invention Serial No. 201911045022.9, filed on Oct. 30, 2019, the disclosures of which are hereby incorporated by reference in their entirety.

TECHNICAL FIELD

The invention relates to overcurrent protection device, in particular to a safety device.

BACKGROUND ART

Fuse is also called as current fuse and is defined by IEC127 standard as "fuse-link". Fuse is used in overload protection. The fuse can be fused to cut off the current to protect the safe operation of the circuit when current of the fuse rises to a certain threshold value in an abnormal situation.

However, present fuse conducts heat fast, so the heat cannot be concentrated at the fusing position, that causes the fuse is not fused in time or is fused at an abnormal position.

Therefore, there is a need for a new safety device to solve the above problem in the prior art.

SUMMARY OF INVENTION

The present invention provides a safety device, which can reduce a diffusion speed of heat and causes a connecting part thereof to be fused in time.

To achieve the above object, the present invention adopts the following technical solution: a safety device or preventing overcurrent comprises a first heat dissipation part made of electrically conductive material, a second heat dissipation part made of electrically conductive material, a connecting part made of electrically conductive material arranged between the first heat dissipation part and the second heat dissipation part, and provided with at least one heat locking hole.

As a further improvement of the invention, each of the first heat dissipation part and the second heat dissipation part is provided with a mounting pin and at least an auxiliary pin.

As a further improvement of the invention, two first auxiliary heat locking openings are provided on each side of a jointing portion of the first heat dissipation part and the connecting part, and two second auxiliary heat locking openings are provided on each side of a jointing portion of the second heat dissipation part and the connecting part.

As a further improvement of the invention, the connecting part has a first heat locking portion, a fusing portion, and a second heat locking portion, the number of the heat locking holes is two, the two heat locking holes are a first heat locking hole located in the first heat locking portion and a second heat locking hole located in the second heat locking portion.

As a further improvement of the invention, the first heat locking portion, the second heat locking portion and the fusing portion are all of a symmetrical structure, the first heat locking portion is provided with a first edge and a second edge which are symmetrical in position and shape, the second heat locking portion is provided with a third edge and a fourth edge which are symmetrical in position and shape, the fusing portion is provided with a fifth edge and a sixth edge which are symmetrical in position and shape, the first edge, the fifth edge and the third edge are sequentially connected, and the second edge, the sixth edge and the fourth edge are sequentially connected.

As a further improvement of the invention, the first heat locking hole and the second heat locking hole are symmetrically in shape, and the first heat locking hole has the same symmetry axis as the first heat locking portion, and the second heat locking hole has the same symmetry axis as the second heat locking portion.

As a further improvement of the invention, a maximum distance from the fifth edge to the sixth edge is less than or equal to a minimum distance from the first edge to the second edge, and also less than or equal to a minimum distance from the third edge to the fourth edge.

As a further improvement of the invention, a sum of two minimum distances from any two symmetrical positions on the first edge and the second edge to the first heat locking hole is greater than a minimum distance from the fifth edge to the sixth edge.

As a further improvement of the invention, a sum of two minimum distances from any two symmetrical positions on the third edge and the fourth edge to the second heat locking hole is greater than a minimum distance from the fifth edge to the sixth side.

As a further improvement of the invention, the heat locking hole is filled with fusible material.

As a further improvement of the invention, the fusing portion is provided with a fusing hole in a symmetrically shape.

As a further improvement of the invention, the fusing hole is filled with an auxiliary fuse material.

As a further improvement of the invention, the fusing portion is an integrally formed with the first heat locking portion and the second heat locking portion.

As a further improvement of the invention, the fusing portion is connected with the first heat locking portion and the second heat locking portion by welding, the first heat locking portion and the second heat locking portion are made of high thermal conductive materials, and the fusing portion is made of fusing material.

To achieve the above object, the present invention also provides a circuit comprises a circuit board, a safety device mounted to the circuit board for preventing overcurrent, the safety device further comprises a first heat dissipation part made of electrically conductive material, a second heat dissipation part made of electrically conductive material, a connecting part made of electrically conductive material arranged between the first heat dissipation part and the second heat dissipation part, and provided with at least one heat locking hole.

To achieve the above object, the present invention also provides a battery pack, comprises a housing, a circuit board disposed in the housing, a safety device mounted to the circuit for preventing overcurrent, the safety device further comprises a first heat dissipation part made of electrically conductive material, a second heat dissipation part made of electrically conductive material, a connecting part made of electrically conductive material arranged between the first heat dissipation part and the second heat dissipation part, and provided with at least one heat locking hole.

The above general description and the following detailed description are intended to be illustrative and not restrictive.

DESCRIPTION OF EMBODIMENT

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with the present invention. On the contrary, they are only examples of devices, systems, machines and methods consistent with some aspects of the invention as detailed in the appended claims.

Figure 1:
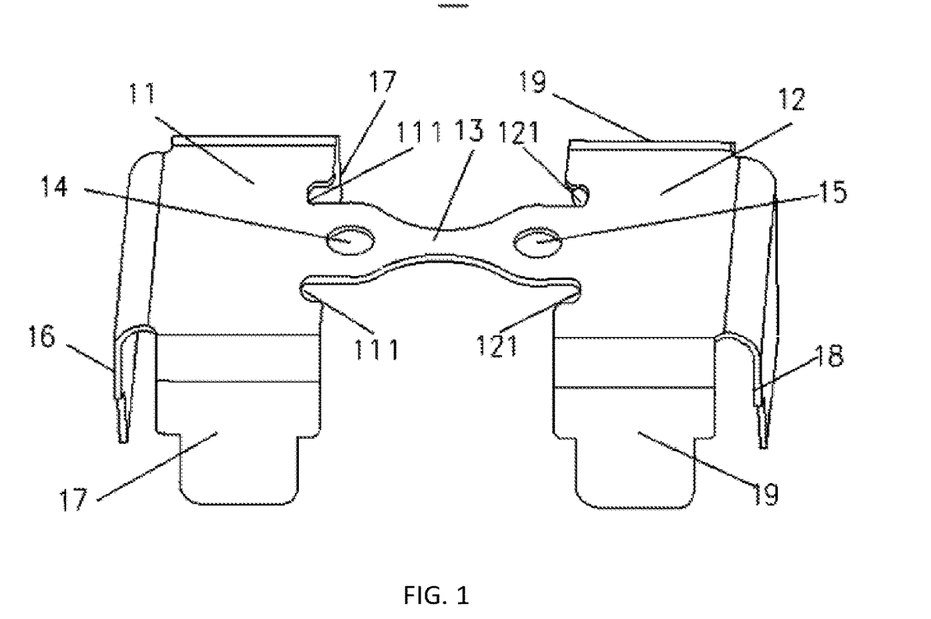
FIG. 1 is a perspective view of a safety device according to a first embodiment of present invention.

In view of the problem in the prior art, an embodiment of present invention provides a safety device. Referring to FIG. 1, the safety device 10 comprises a first dissipation part 11, a second dissipation part 12, and a connecting part 13 disposed between the first dissipation part 11 and the second dissipation part 12. The connecting part 13 is provided with a first heat locking hole 14 and a second heat locking hole 15, the first heat dissipation portion 11 is provided with a first mounting pin 16 on a left side thereof (i.e., a side away from the connecting part 13), and two first auxiliary pins 17 on a front side thereof and a rear side thereof respectively. The second heat dissipation portion 12 is provided with a second mounting pin 18 on a right side thereof (i.e., a side away from the connecting part 13) and two second auxiliary pins 19 on a front side thereof and a rear side thereof respectively.

Referring to FIG. 1, the first dissipation part 11 has two first auxiliary heat locking openings 111 disposed on both sides of a jointing part of the first heat dissipation portion 11 and the connecting portion 13, the second dissipation part 12 has two second auxiliary heat locking openings 121 disposed on both sides of a jointing part of the second heat dissipation portion 12 and the connecting portion 13. The two first auxiliary heat locking opening 111 reduces a connecting surface of the first dissipation part 11 and the connecting part 13, and the second auxiliary heat locking opening 121 reduces a connecting surface of the second dissipation part 12 and the connecting part 13, that can slow down the heat transfer speed and avoids rapid temperature diffusion.

Figure 2:
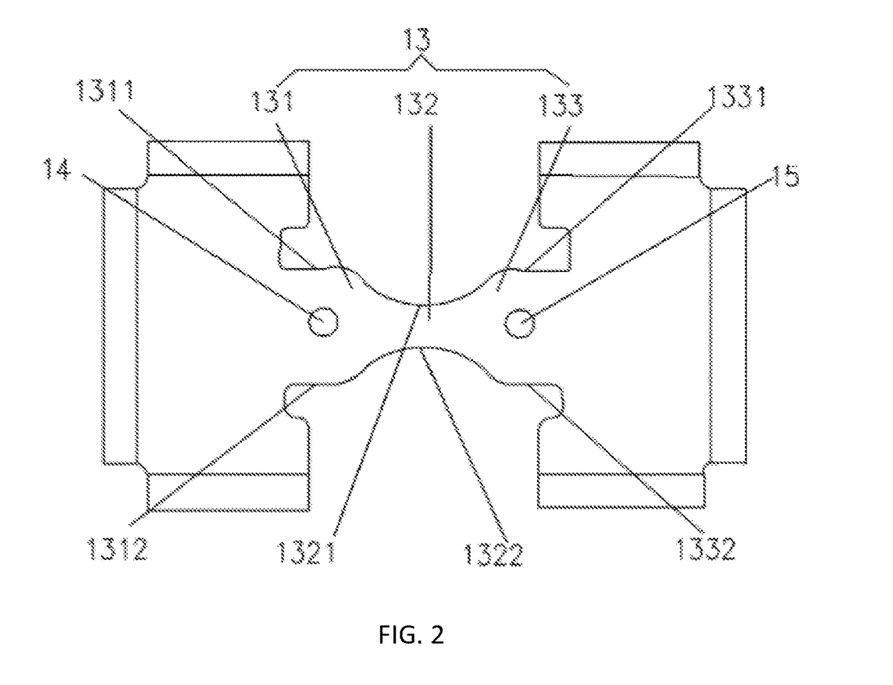
FIG. 2 is a top view of the safety device shown in FIG. 1.

FIG. 2 is a top view of the safety device shown in FIG. 1, referring to FIG. 2, the connecting part 13 has a first heat locking portion 131, a fusing portion 132 and a second heat locking portion 133 in sequence from left to right, the connecting part 13 is a symmetrical structure, the first heat locking hole 14 is located in the first heat locking portion 131, the second heat locking hole 15 is located in the second heat locking portion 133, the fusing portion 132 is an integrally formed with the first heat locking portion 131 and the second heat locking portion 133.

In some embodiments of present invention, the first heat locking portion 131, the integrally formed fusing portion 132, and the second heat locking portion 133 is made of a metal material, such as copper alloy, nickel, aluminum, etc.

In some embodiments of present invention, the first heat locking portion 131, the integrally formed fusing portion 132, and the second heat locking portion 133 is made of brass.

In some embodiments of present invention, referring to FIG. 2, the first heat locking portion 131, the fusing portion 132 and the second heat locking portion 133 are all of a symmetrical structure, the first heat locking portion 131 is provided with a first edge 1311 and a second edge 1312, which are symmetrical in position and shape. The second heat locking portion 133 is provided with a third edge 1331 and a fourth edge 1332, which are symmetrical in position and shape. The fusing portion 132 is provided with a fifth edge 1321 and a sixth edge 1322, which are symmetrical in position and shape. The first edge 1311 is connected with one end of the fifth edge 1321, the other end of the fifth edge 1321 is connected with the third edge 1331, the second edge 1312 is connected with one end of the sixth edge 1322, and the other end of the sixth edge 1322 is connected with the fourth edge 1332, the first heat locking hole 14 is located on a symmetry axis of the first heat locking portion 131, and the second heat locking hole 15 is located on a symmetry axis of the second heat locking portion 133.

In some embodiments of present invention, the first heat locking portion 131 has the same axis of symmetry as the second heat locking portion 132. In some preferred embodiments of present invention, a maximum distance from the fifth edge 1321 to the sixth edge 1322 is less than or equal to a minimum distance from the first edge 1311 to the second edge 1312, and is also less than or equal to a minimum distance from the third edge 1331 to the fourth edge 1332. A sum of two minimum distances from any two symmetrical positions on the first edge 1311 and the second edge 1312 to the first heat locking hole 14 respectively, is greater than a minimum distance from the fifth edge 1321 to the sixth edge 1322. A sum of two minimum distances from any two symmetrical positions on the third edge 1331 and the fourth edge 1332 to the second heat locking hole 15 respectively, is greater than the minimum distance from the fifth edge 1321 to the sixth edge 1322 too. Wherein, the maximum distance between two edges is a maximum value of the distances between all the symmetrical points on the two edges; the minimum distance between two edges is the minimum value of the distances between all the symmetrical points on the two edges.

In some embodiments of present invention, the first heat locking hole 14 and the second heat locking hole 15 are both symmetrical in shape, and the first heat locking hole 14 has the same symmetry axis as the first heat locking portion 131, and the second heat locking hole 15 has the same symmetry axis as the second heat locking portion 133. Therefore, a distance from a position of the first edge 1311 to the center of the first heat locking hole 14 is equal to a distance from a corresponding symmetrical position of the second edge 1312 to the center of the first heat locking hole 14, and a distance from a position of the third edge 1331 to the center of the second heat locking hole 15 is equal to a distance from a corresponding symmetrical position of the fourth edge 1332 to the center of the second heat locking hole 15.

In some embodiments of present invention, the first heat locking hole 14 and the second heat locking hole 15 have the same shape and size and are symmetrically in position.

In some embodiments of present invention, referring to FIG. 2, the first heat locking hole 14 and the second heat locking hole 15 are circular in shape.

In some embodiments of present invention, the first heat locking hole 14 and the second heat locking hole 15 are filled with a fusible material, which can melt quickly after absorbing heat, so as to decrease the temperature of first heat locking portion 131 and the second heat locking portion 133, extend the fusing time of the fusing portion 132 and avoid fusing when the fusing requirement is not met.

In some embodiments of present invention, the fusible material is tin whose melting point is 231.

Figure 3:
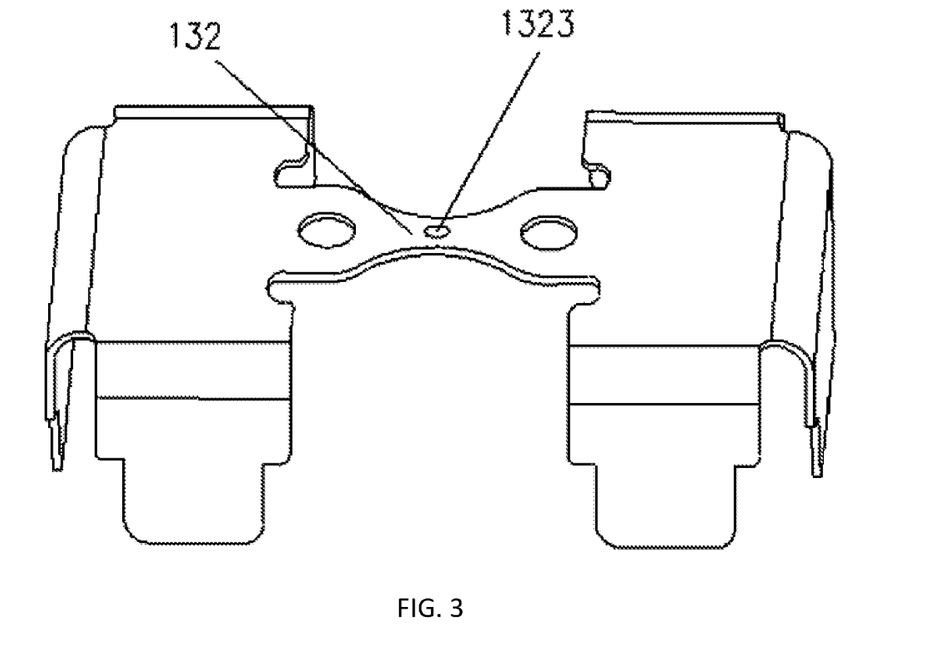
FIG. 3 is a perspective view of the safety device according to another embodiment of the present invention.

FIG. 3 is a perspective view of another safety device according to some embodiments of present invention. The safety device shown in FIG. 3 is the same as the safety device shown in FIG. 1 in structure, and the difference is that the fusing portion 132 is provided with a fusing hole 1323.

In some embodiments of the invention, the first heat locking hole 14 communicates with the second heat locking hole 15 by the fusing hole 1323.

In some embodiments of the invention, the fusing hole 1323 of the fusing portion 132 is filled with a fusible material. When a high heavy current passes through the fusing portion 132, the fusible material can preferentially melt into liquid, according to diffusion principle, a very strong diffusion motion is occurred between the fusible material and the fusing portion 132, a high temperature of the fusing portion 132 is more conducive to the diffusion motion, and tension is occurred between the fusible material in liquid form and the fusing portion 132 in solid form during the diffusion process, the tension aggravates the diffusion motion and makes the fusing portion 132 is easily fused.

In some embodiments of present invention, the fusible material is tin.

In some embodiments of present invention, the fusing hole 1323 is in a symmetrical shape, such that a distance from the fifth edge 1321 to the center of the fusing hole 1323 is equal to the distance from the symmetrical position of the sixth edge 1322 to the center of the fusing hole 1323.

In some embodiments of present invention, the shape of the fusing hole is oval, square, diamond, circle, etc., and the shape of the first heat locking hole and the second heat locking hole may also be but not limited to above shape.

Figure 4:
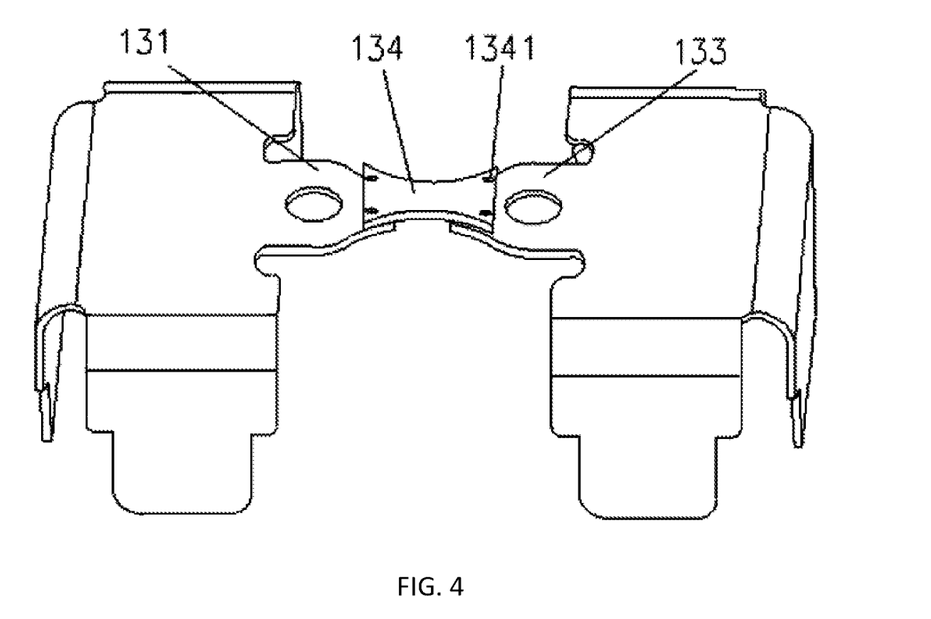
FIG. 4 is a perspective view of the safety device according to another embodiment of the present invention.

FIG. 4 is a perspective view of another safety device according to some embodiments of present invention. The safety device shown in FIG. 4 is the same as the safety device shown in FIG. 1 in structure, and the difference is that the fusing portion is a welded fusing portion 134, the welded fusing portion 134 is connected with the first heat locking portion 131 and the second heat locking portion 133 in a welding manner, the first heat locking portion 131 and the second heat locking portion 133 are made of high-heat-conductivity materials, and the welded fusing portion 134 is made of fusing materials. The first heat locking portion 131 and the second heat locking portion 133 do not need to be fused, and their fusing characteristics do not need to be considered, so that the first heat locking portions 131 and the second heat locking portion 133 can made of any high thermal conductive material known in this field.

In some embodiments of present invention, referring to FIG. 4, the welded fusing portion 134 has some bumps 1341 for being welded by resistance welding.

In some embodiments of present invention, the welded fusing portion 134 has no bump for being welded by laser welding.

In some embodiments of present invention, the fusing material of the welded fusing portion 134 is aluminum, whose melting point is 660° C. and can meet the fusing requirement.

Figure 5A:
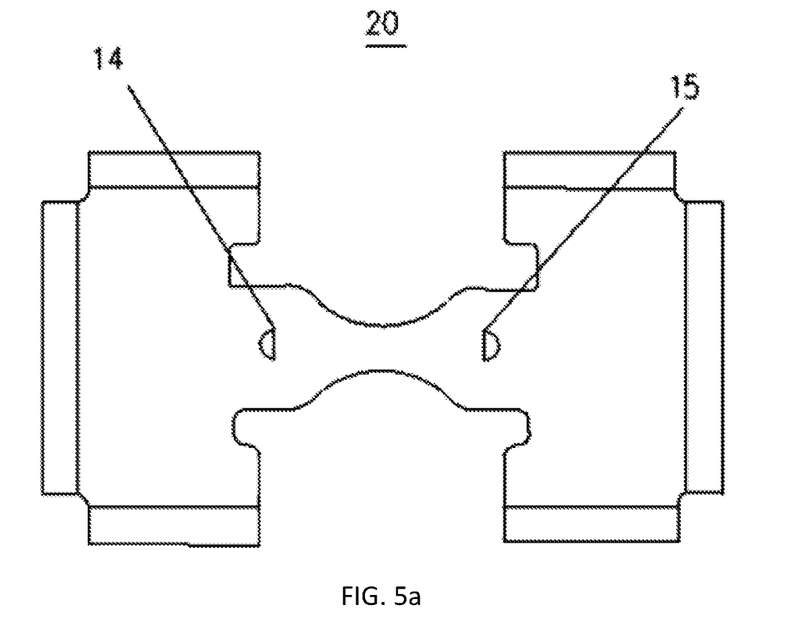
FIG. 5a is a top view of the safety device according to another embodiment of present invention.

FIG. 5a is a top view of another safety device according to some embodiments of present invention. Referring to FIG. 5a and FIG. 1, the safety device 20 differs from the safety device 10 in that: the first heat locking hole 14 and the second heat locking hole 15 are semicircular.

Figure 5B:
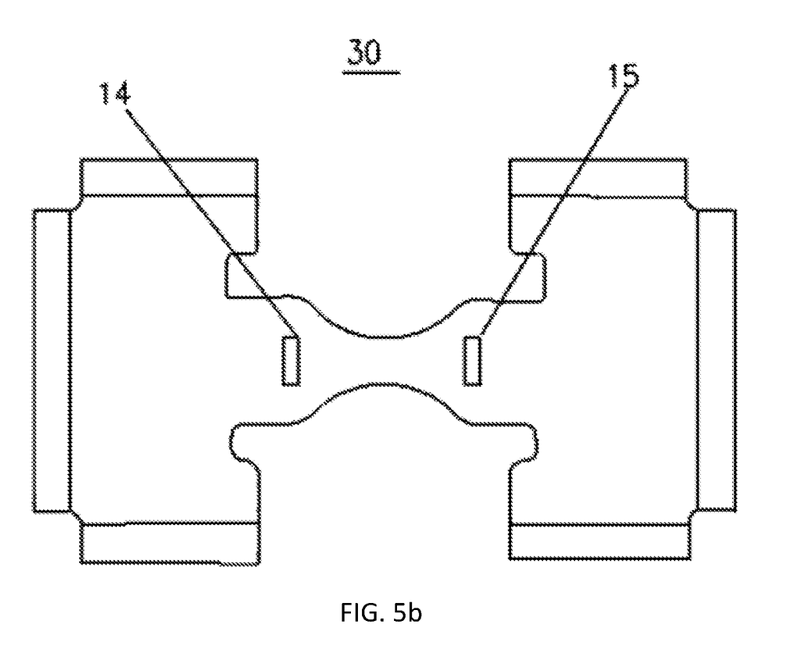
FIG. 5b is a top view of the safety device according to another embodiment of present invention.

FIG. 5b is a top view of another safety device according to some embodiments of present invention. Referring to FIG. 5b and FIG. 1, the safety device 30 differs from the safety device 10 in that: the first heat locking hole 14 and the second heat locking hole 15 are rectangular.

Figure 5C:
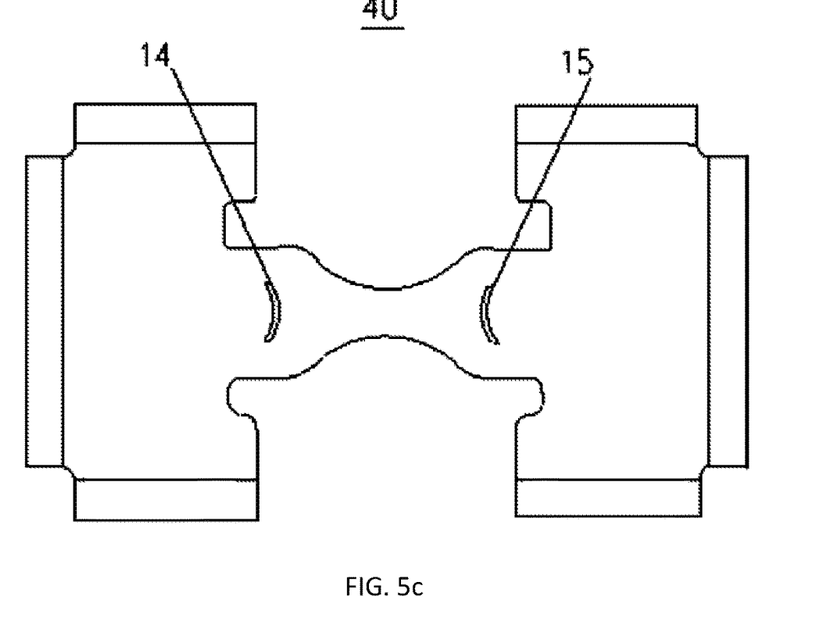
FIG. 5c is a top view of the safety device according to another embodiment of present invention.

FIG. 5c is a top view of another safety device according to some embodiments of present invention. Referring to FIG. 5c and FIG. 1, the safety device 40 differs from the safety device 10 in that: the first heat locking hole 14 and the second heat locking hole 15 are circular arc.

Figure 6A:
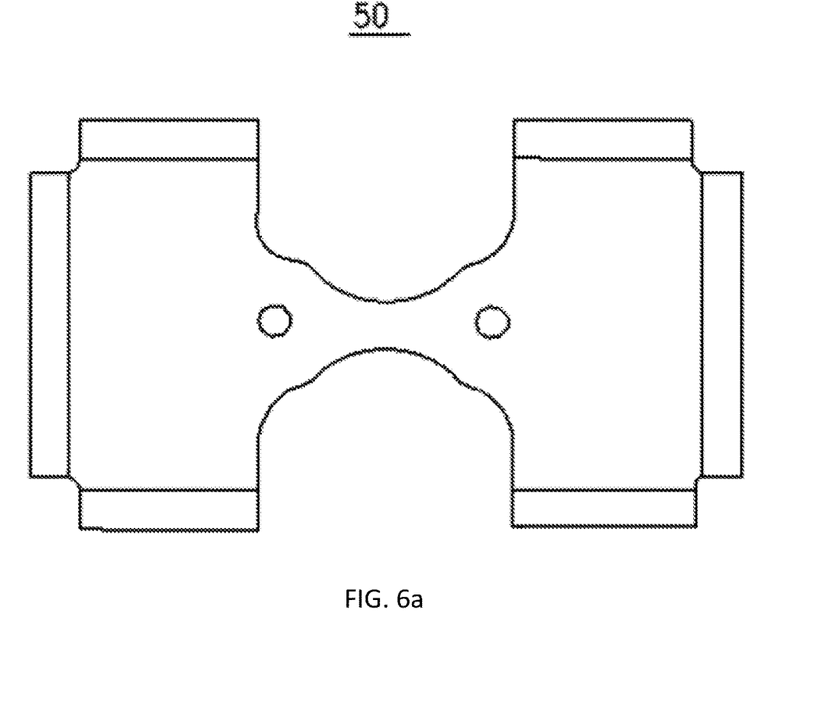
FIG. 6a is a top view of the safety device according to another embodiment of present invention.

FIG. 6a is a top view of another safety device according to some embodiments of the invention. Referring to FIG. 6a and FIG. 1, the safety device 50 differs from the safety device 10 in that: the fifth safety device 50 cancels the first auxiliary heat locking slot 111 and the second auxiliary heat locking slot 121.

Figure 6B:
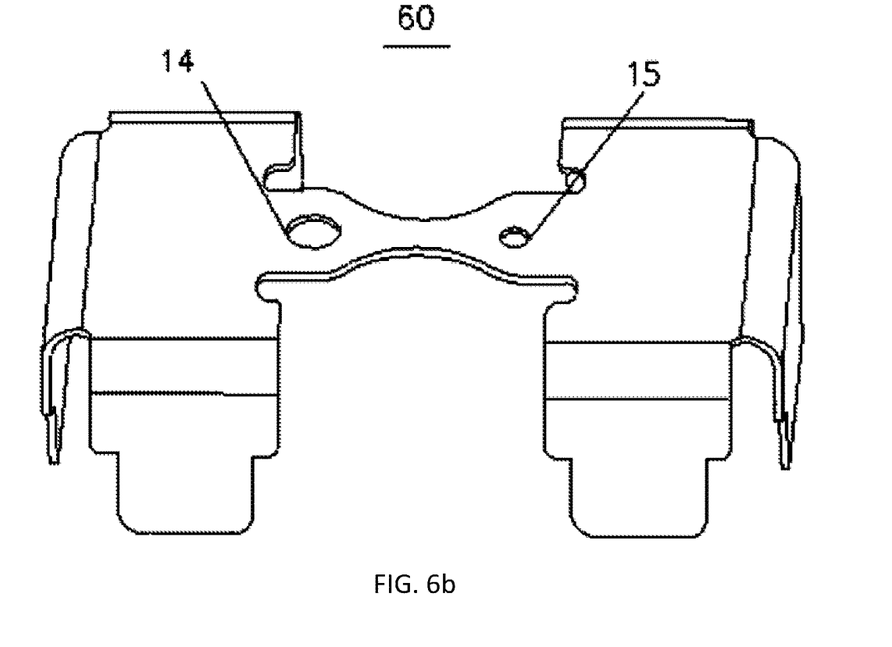
FIG. 6b is a perspective view of the safety device according to another embodiment of present invention.

FIG. 6b is a perspective view of another safety device according to some embodiments of present invention. Referring to FIG. 6b and FIG. 1, the safety device 60 differs from the safety device 10 in that: the first heat locking hole 14 and the second heat locking hole 15 are different in size.

Figure 6C:
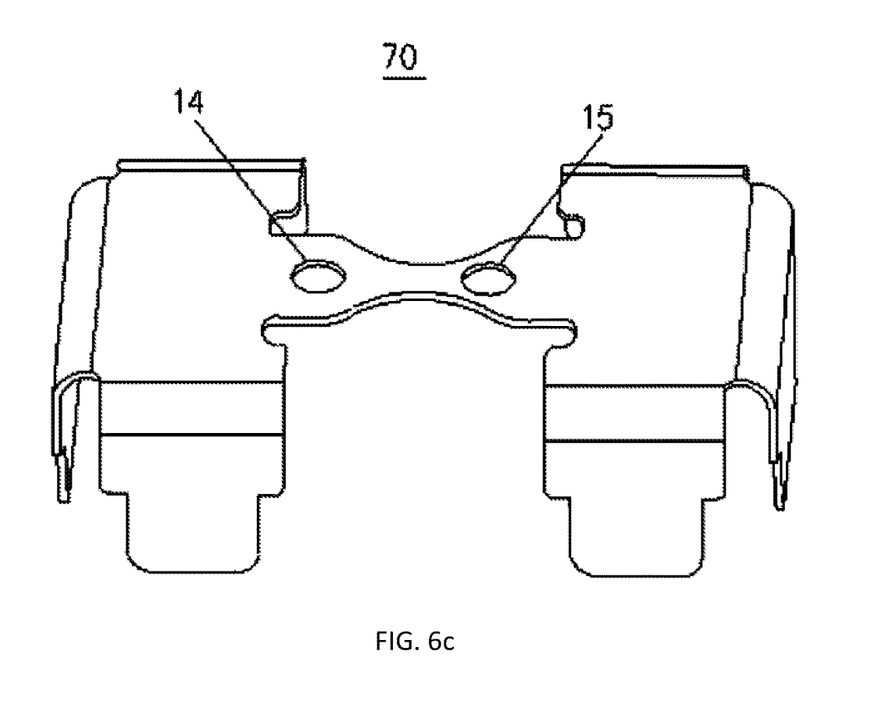
FIG. 6c is a perspective view of the safety device according to another embodiment of present invention.

FIG. 6c is a perspective view of another safety device according to some embodiments of present invention. Referring to FIG. 6c and FIG. 1, the safety device 70 differs from the safety device 10 in that: the first heat locking hole 14 and the second heat locking hole 15 are not symmetrical in position.

Figure 6D:
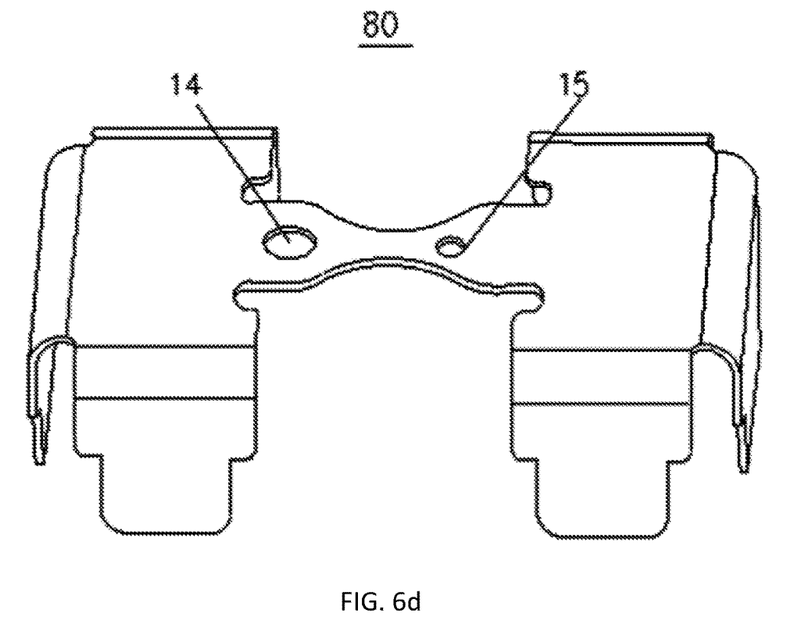
FIG. 6d is a perspective view of the safety device according to another embodiment of present invention.

FIG. 6d is a perspective view of another safety device according to some embodiments of present invention. Referring to FIG. 6d and FIG. 1, the safety device 80 differs from the safety device 10 in that: the first heat locking hole 14 and the second heat locking hole 15 are asymmetric in position and different in size.

Figure 6E:
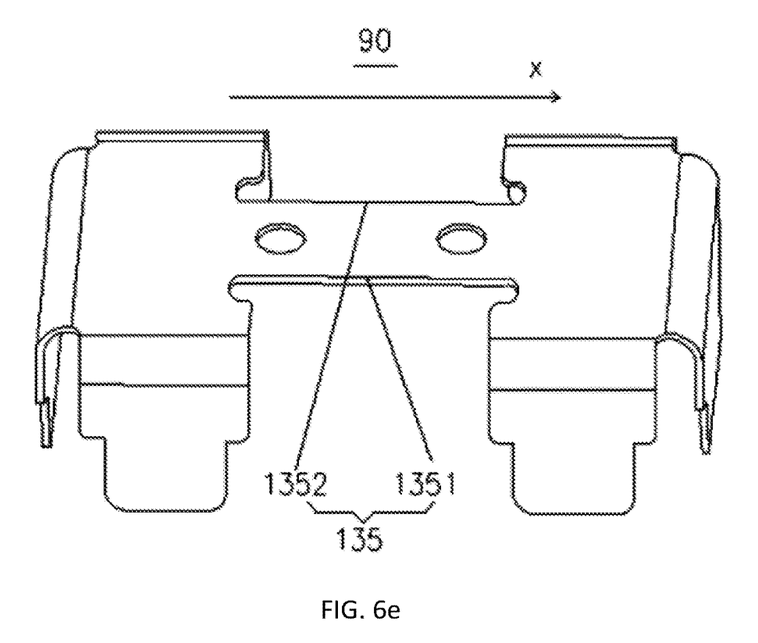
FIG. 6e is a perspective view of the safety device according to another embodiment of present invention.

FIG. 6e is a perspective view of another safety device according to some embodiments of present invention. Referring to FIG. 6e and FIG. 1, the safety device 90 differs from the safety device 10 in that: the first connection section 135 includes a first front edge 1351 and a first rear edge 1352, both of which are parallel to X-axis.

Figure 6F:
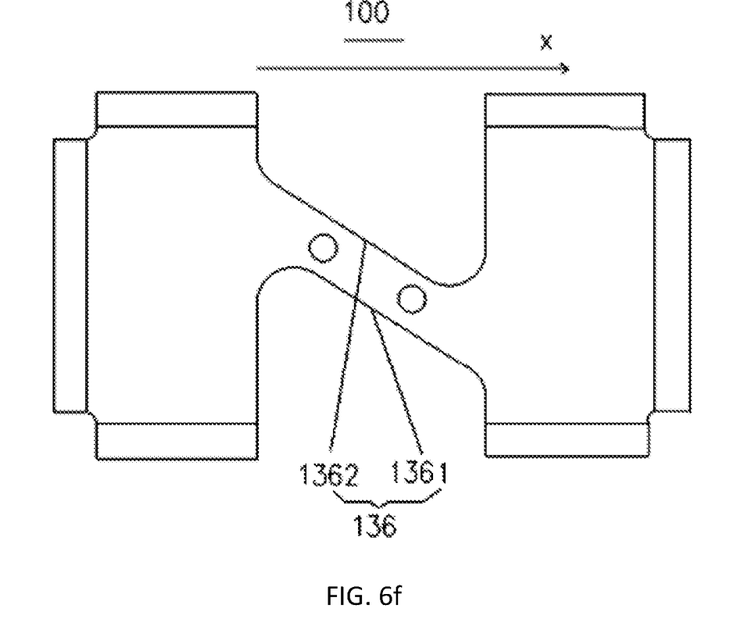
FIG. 6f is a top view of the safety device according to another embodiment of present invention.

FIG. 6f is a top view of another safety device according to some embodiments of the invention. Referring to FIG. 6f, 6e and FIG. 1, the safety device 100 differs from the safety device 90 in that: the second connecting part 136 includes a second front edge 1361 and a second rear edge 1362 parallel to the second rear edge 1362, wherein the second front edge 1361 is not parallel to X-axis, and the first auxiliary heat locking portion and the second auxiliary heat locking portion are canceled.

Figure 7A:
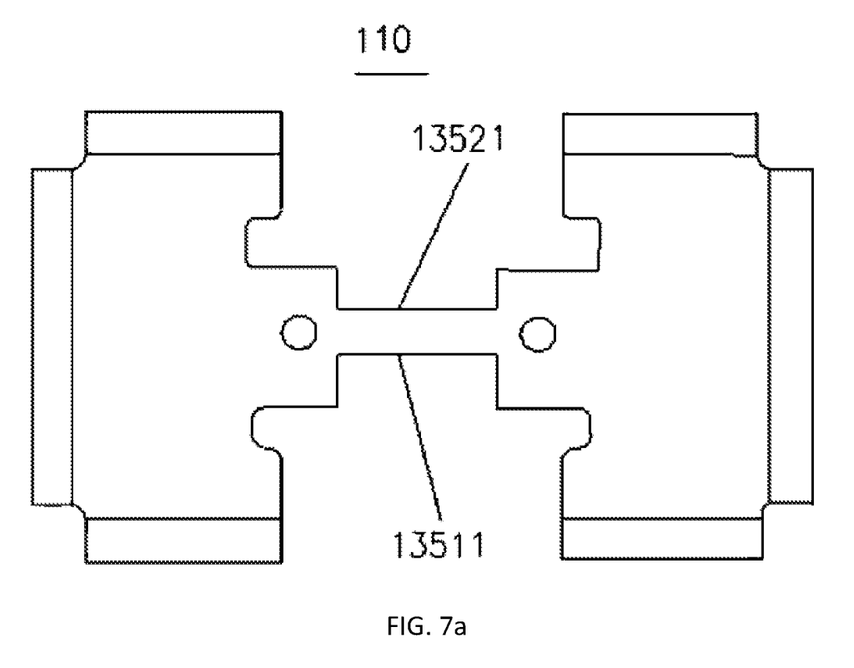
FIG. 7a is a top view of the safety device according to another embodiment of present invention.

FIG. 7a is a top view of another safety device according to some embodiments of the invention. Referring to FIG. 7a and FIG. 6e, the safety device 110 differs from the safety device 90 in that: a first rectangular notch 13511 is provided at the midpoint of the first front edge 1351, a second rectangular notch 13521 is provided at the midpoint of the first rear edge 1352, and the first rectangular notch 13521 and the second rectangular notch 13511 are identical in size.

Figure 7B:
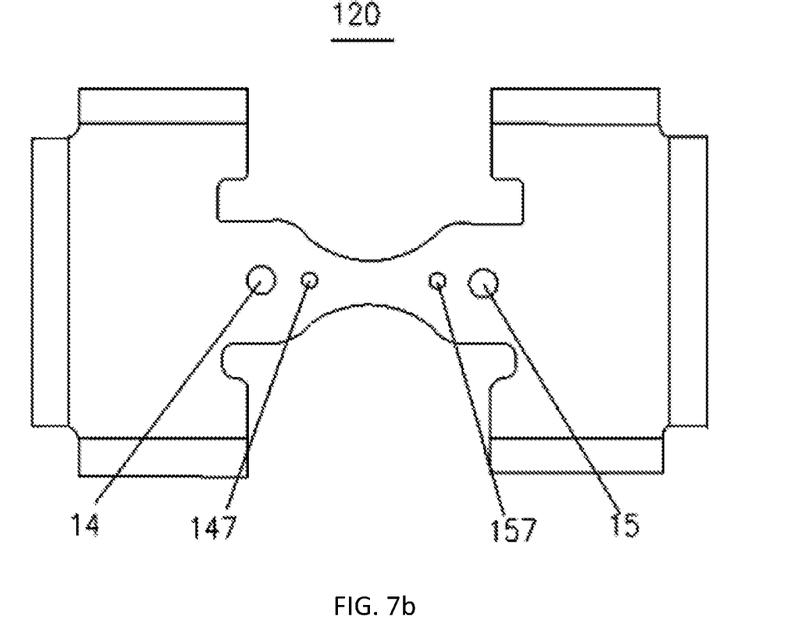
FIG. 7b is a top view of the safety device according to another embodiment of present invention.

FIG. 7b is a top view of another safety device according to some embodiments of present invention. Referring to FIG. 7b and FIG. 1, the safety device 120 differs from the safety device 10 in that: a first sub heat locking hole 147 and a second sub heat locking hole 157 are symmetrically arranged on the central connecting line of the first heat locking hole 14 and the second heat locking hole 15, and have the same symmetry axis as the first heat locking hole 14 and the second heat locking hole 15.

Figure 7C:
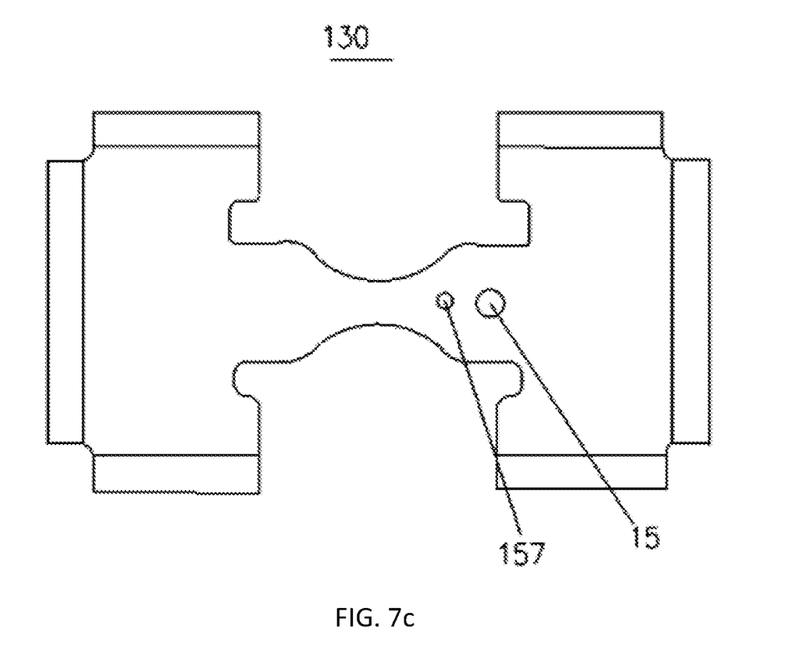
FIG. 7c is a top view of the safety device according to another embodiment of present invention.

FIG. 7c is a top view of another safety device according to some embodiments of the invention. Referring to FIG. 7c and FIG. 7b, the safety device 130 differs from the safety device 10 in that: the safety device 130 is only provided with the second heat locking hole 15 and the second sub heat locking hole 157, and cancels the first heat locking hole 14 and the first sub heat locking hole 147.

Figure 7D:
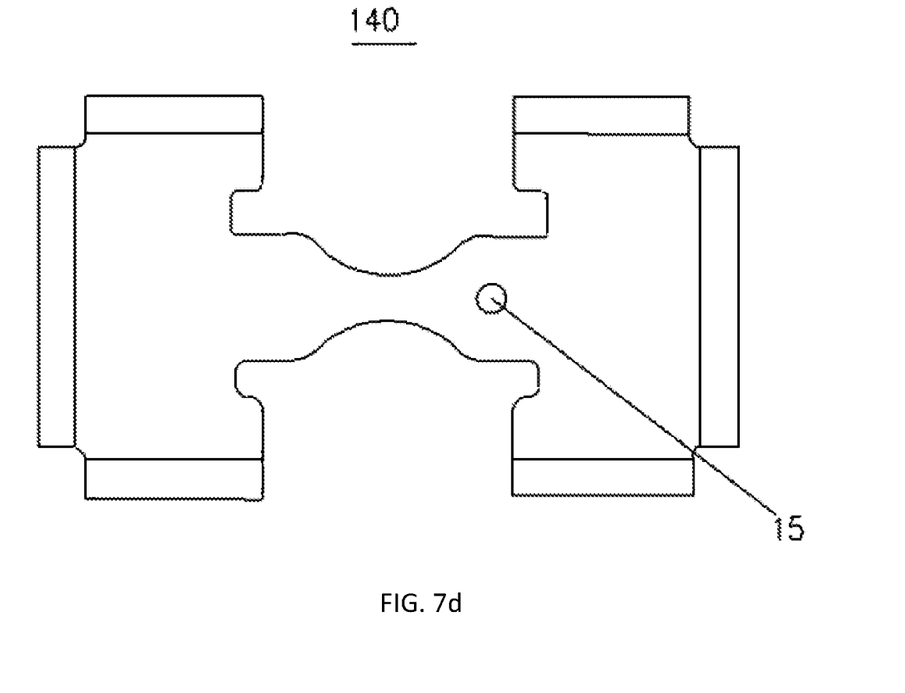
FIG. 7d is a top view of the safety device according to another embodiment of present invention.

FIG. 7d is a top view of another safety device according to some embodiments of the invention. Referring to FIG. 7d and FIG. 1, the safety device 140 differs from the safety device 10 in that: the safety device 140 is provided with a second heat locking hole 15, and cancels the first heat locking hole 14.

Figure 8:
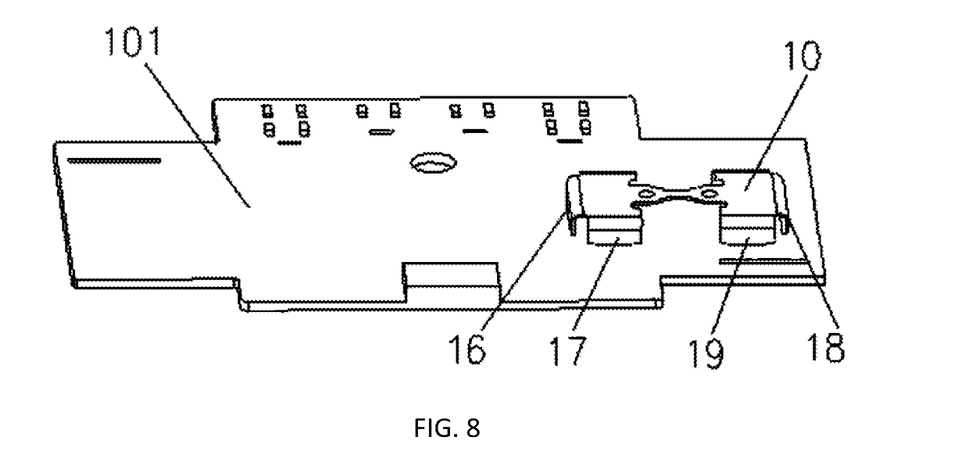
FIG. 8 is a perspective view of the safety device mounted to the circuit board according to an embodiment of present invention.

FIG. 8 is a perspective view of the installation of a safety device according to some embodiments of present invention. Referring to FIG. 8 and FIG. 1, the safety device 10 is mounted on the printed circuit board 101 through the first mounting pin 16, the second mounting pin 18, the first auxiliary pin 17 and the second auxiliary pin 19.

The above embodiment is only used to illustrate the present invention and not to limits the technical solutions described in the present invention. The understanding of this specification should be based on those skilled in the art, although the present invention has been described in detail with reference to the above embodiment. However, those skilled in the art should understand that those skilled in the art can still modify or equivalently replace the present invention, and all technical solutions and improvements that do not depart from the spirit and scope of the present invention should be within the scope of the claims of the invention.

What is claimed is:

1. A safety device for preventing overcurrent, comprising:
a first heat dissipation part made of electrically conductive material;
a second heat dissipation part made of electrically conductive material, the second heat dissipation part and the first heat dissipation part being symmetrically shaped; and
a connecting part made of electrically conductive material arranged between the first heat dissipation part and the second heat dissipation part;
the connecting part comprising:
a first heat locking portion connecting to the first heat dissipation part,
a second heat locking portion connecting to the second heat dissipation part, and
a fusing portion connecting between the first heat locking portion and the second heat locking portion; and the first heat locking portion and the second heat locking portion having a same structure, but different heat locking hole features;
wherein the first heat locking portion, the second heat locking portion and the fusing portion are all of a symmetrical structure, the first heat locking portion is provided with a first edge and a second edge which are symmetrical in position and shape, the second heat locking portion is provided with a third edge and a fourth edge which are symmetrical in position and shape, the fusing portion is provided with a fifth edge and a sixth edge which are symmetrical in position and shape, the first edge, the fifth edge and the third edge are sequentially connected, and the second edge, the sixth edge and the fourth edge are sequentially connected;
wherein each of the fifth edge and the sixth edge has an arc-shaped overall outline, and a minimum distance from the fifth edge to the sixth edge is located on a central position of the fusing portion;
wherein each of the first heat dissipation part and the second heat dissipation part is provided with a mounting pin and at least an auxiliary pin; and
wherein two first auxiliary heat locking openings are provided on each side of a jointing portion of the first heat dissipation part and the connecting part, and two second auxiliary heat locking openings are provided on each side of a jointing portion of the second heat dissipation part and the connecting part.

2. The safety device according to claim 1, wherein the fusing portion is provided with a symmetrically shaped fusing hole.

3. The safety device according to claim 2, wherein the fusing hole is filled with an auxiliary fuse material.

4. The safety device according to claim 1, wherein the fusing portion is connected with the first heat locking portion and the second heat locking portion by welding, the first heat locking portion and the second heat locking portion are made of thermal conductive materials, and the fusing portion is made of fusing material.

5. The safety device according to claim 1, wherein a maximum distance from the fifth edge to the sixth edge is less than or equal to a minimum distance from the first edge to the second edge, and also less than or equal to a minimum distance from the third edge to the fourth edge.

6. The safety device according to claim 1, wherein the first heat locking portion comprises a first heat locking hole, the second heat locking portion comprises a second heat locking hole, and the different heat locking hole features comprise:
the first heat locking hole and the second heat locking hole being different in size.

7. The safety device according to claim 1, wherein the first heat locking portion comprises a first heat locking hole, the second heat locking portion comprises a second heat locking hole, and the different heat locking hole features comprise:
the first heat locking hole and the second heat locking hole being asymmetrical in position.

8. The safety device according to claim 1, wherein the first heat locking portion comprises a first heat locking hole, the second heat locking portion comprises a second heat locking hole, and the different heat locking hole features comprise:
the first heat locking hole and the second heat locking hole being asymmetrical in position and different in size.

9. The safety device according to claim 8, wherein the first heat locking hole has a same symmetry axis as the first heat locking portion, and the second heat locking hole has a same symmetry axis as the second heat locking portion.

10. The safety device according to claim 8, wherein a sum of two minimum distances from any two symmetrical positions on the first edge and the second edge to the first heat locking hole is greater than a minimum distance from the fifth edge to the sixth edge.

11. The safety device according to claim 8, wherein a sum of two minimum distances from any two symmetrical positions on the third edge and the fourth edge to the second heat locking hole is greater than a minimum distance from the fifth edge to the sixth edge.

12. The safety device according to claim 1, wherein the different heat locking hole features comprise:
only one of the first heat locking portion and the second heat locking portion comprising a heat locking hole.

13. The safety device according to claim 12, wherein the heat locking hole is filled with fusible material.

14. The safety device according to claim 12, wherein the one of the first heat locking portion and the second heat locking portion comprising the heat locking hole further comprises a sub heat locking hole that is smaller in size and positioned closer to the fusing portion than the heat locking hole.

15. A circuit, comprising:
a circuit board;
a safety device mounted to the circuit board for preventing overcurrent, the safety device comprising:
a first heat dissipation part made of electrically conductive material;
a second heat dissipation part made of electrically conductive material, the second heat dissipation part and the first heat dissipation part being symmetrically shaped; and
a connecting part made of electrically conductive material arranged between the first heat dissipation part and the second heat dissipation part;
the connecting part comprising:
a first heat locking portion connecting to the first heat dissipation part,
a second heat locking portion connecting to the second heat dissipation part, and
a fusing portion connecting between the first heat locking portion and the second heat locking portion; and the first heat locking portion and the second heat locking portion having a same structure, but different heat locking hole features;
wherein the first heat locking portion, the second heat locking portion and the fusing portion are all of a symmetrical structure, the first heat locking portion is provided with a first edge and a second edge which are symmetrical in position and shape, the second heat locking portion is provided with a third edge and a fourth edge which are symmetrical in position and shape, the fusing portion is provided with a fifth edge and a sixth edge which are symmetrical in position and shape, the first edge, the fifth edge and the third edge are sequentially connected, and the second edge, the sixth edge and the fourth edge are sequentially connected;
wherein each of the fifth edge and the sixth edge has an arc-shaped overall outline, and a minimum distance from the fifth edge to the sixth edge is located on a central position of the fusing portion;
wherein each of the first heat dissipation part and the second heat dissipation part is provided with a mounting pin and at least an auxiliary pin; and
wherein two first auxiliary heat locking openings are provided on each side of a jointing portion of the first heat dissipation part and the connecting part, and two second auxiliary heat locking openings are provided on each side of a jointing portion of the second heat dissipation part and the connecting part.

16. A battery pack, comprising:
a housing;
a circuit board disposed in the housing;
a safety device mounted to the circuit board for preventing overcurrent, the safety device comprising:
a first heat dissipation part made of electrically conductive material;
a second heat dissipation part made of electrically conductive material, the second heat dissipation part and the first heat dissipation part being symmetrically shaped; and
a connecting part made of electrically conductive material arranged between the first heat dissipation part and the second heat dissipation part;
the connecting part comprising:
a first heat locking portion connecting to the first heat dissipation part,
a second heat locking portion connecting to the second heat dissipation part, and
a fusing portion connecting between the first heat locking portion and the second heat locking portion; and the first heat locking portion and the second heat locking portion having a same structure, but different heat locking hole features;
wherein the first heat locking portion, the second heat locking portion and the fusing portion are all of a symmetrical structure, the first heat locking portion is provided with a first edge and a second edge which are symmetrical in position and shape, the second heat locking portion is provided with a third edge and a fourth edge which are symmetrical in position and shape, the fusing portion is provided with a fifth edge and a sixth edge which are symmetrical in position and shape, the first edge, the fifth edge and the third edge are sequentially connected, and the second edge, the sixth edge and the fourth edge are sequentially connected;
wherein each of the fifth edge and the sixth edge has an arc-shaped overall outline, and a minimum distance from the fifth edge to the sixth edge is located on a central position of the fusing portion;
wherein each of the first heat dissipation part and the second heat dissipation part is provided with a mounting pin and at least an auxiliary pin; and
wherein two first auxiliary heat locking openings are provided on each side of a jointing portion of the first heat dissipation part and the connecting part, and two second auxiliary heat locking openings are provided on each side of a jointing portion of the second heat dissipation part and the connecting part.

17. The safety device according to claim 2, wherein the fusing hole does not extend to where there is a maximum distance from the fifth edge to the sixth edge.

18. The safety device according to claim 2, wherein the first heat locking portion comprises a first heat locking hole, the second heat locking portion comprises a second heat locking hole, and the first heat locking hole communicates with the second heat locking hole by the fusing hole.

* * * * *